Sept. 20, 1971    M. ARMAND ET AL    3,605,254
METALLURGICAL BONDING
Filed Sept. 6, 1968
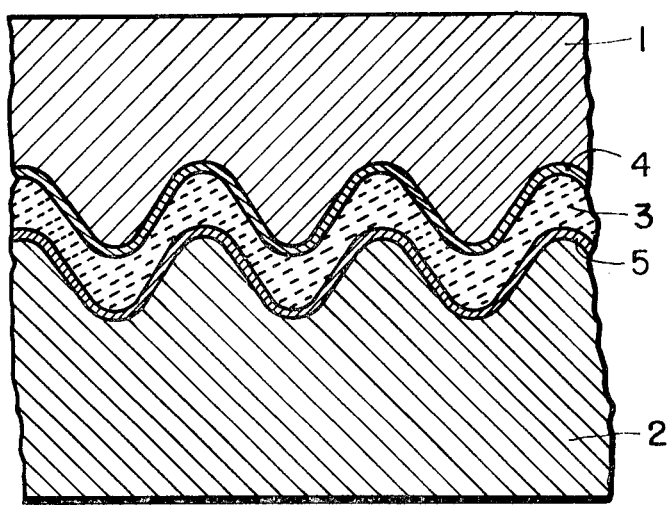
INVENTORS.
Marcel Armand
Michel Charveriat
Jean-Pierre Givord
BY
THEIR ATTORNEYS United States Patent Office 3,605,254
Patented Sept. 20, 1971

3,605,254
METALLURGICAL BONDING
Marcel Armand, Michel Charveriat, and Jean-Pierre Givord, Albertville, France, assignors to Ugine Kuhlmann, Paris, France
Filed Sept. 6, 1968, Ser. No. 758,064
Int. Cl. B21d 39/04
U.S. Cl. 29—473.7
9 Claims

ABSTRACT OF THE DISCLOSURE

A process for providing a metallurgical bond between a special metal piece of Ti, Zr, Hf, U, Nb, Ta or alloys of these metals and a steel piece. A mechanical junction is first prepared providing a slight clearance between both pieces. The surfaces of the pieces facing the junction are treated with a molten flux. Thereafter, the junction is filled with a brazing alloy consisting essentially of Al, Si, Fe and the special metal. After the junction is filled, it is allowed to cool.

---

It is difficult to provide a metallurgical bond between surfaces of metals such as Ti, Zr, Hf, U, Nb, Ta or their alloys and steel surfaces. (Hereafter in this specification Ti, Zr, Hf, U, Nb, Ta and their alloys will all be referred to as special metals.) Welding is not a suitable process for joining special metals and steel because during welding intermetallic compounds of the special metal and iron are formed. These compounds make the welding zone brittle after cooling.

It has been proposed to join steel and special metals by brazing. The surfaces to be joined are coated with a brazing alloy. They are then juxtaposed and heated in a vacuum to a temperature above the melting point of the brazing alloy so it will penetrate all the interstices between both surfaces. To avoid the use of a vacuum it has also been proposed to use brazing alloys rich in aluminum which may be applied by dip-coating. Unfortunately, during the brazing treatment thick layers of brittle intermetallic compounds are formed by reaction between the aluminum rich brazing alloy and the steel surface or the special metal surface. These intermetallic layers are, of course, detrimental to the formation of a good bond.

If the brazing alloys are aluminum-silicon alloys containing 1 to 40% silicon, the intermetallic layers formed during brazing are irregular and excessively thick. Furthermore, the dimensions of the pieces to be assembled are often reduced. These effects result from the impossibility of controlling the growth rate of the intermetallic compounds. This rate cannot be controlled because the aluminum-silicon alloy is not stable in the presence of steel or the special metals.

Our invention provides a method of providing a metallurgical bond between special metals and steel avoiding the disadvantages of prior art processes described above. Our invention is based upon the discovery of a new brazing alloy which is compatible with both the special metals and steel.

The method of providing a metallurgical bond between a special metal piece and a steel piece according to this invention consists of first preparing a mechanical junction between the special metal piece and the steel piece. A slight clearance is provided in the junction. The surfaces of the junction are treated with a molten flux. Then the junction is filled with a molten aluminum alloy analyzing as follows. (All percentages are by weight.)

Silicon: 1 to 13%
Iron: 0.2 to 10%
Special metal to be joined: 0.2 to 10%
Alloying elements, if any, of the steel or special metal: up to 15%
Aluminum: the remainder.

Thereafter, the junction is allowed to cool.

According to a preferred embodiment of this invention the junction is immersed in a bath of the aluminum alloy described above. The bath is maintained at a temperature between 575 and 800° C. and is at least partially covered with a layer of molten flux. The molten flux is comprised of alkaline fluorides and in some instances alkaline chlorides. The junction is dipped through the flux layer into the metallic bath and maintained there for a period of 5 to 30 minutes. It is preferable if the junction is moved back and forth from the bath to the flux layer during this time. Thereafter, the junction is swiftly withdrawn from the alloy bath preferably without moving through the flux layer. The clearance provided between both of the surfaces forming the junction should be sufficient to permit a layer of the brazing alloy to form in the junction.

The layer of brazing alloy in junctions according to this invention is well bonded to each of the adjacent surfaces. The brazing alloy reacts with the surface of the special metal to form a compound containing at least Al, Si and the special metal. The brazing alloy reacts with the steel to form a compound containing at least Al, Si and Fe. As the brazing alloy is saturated with the special metal, iron and the alloying elements of the special metal and the steel, the intermediate layers formed by reaction of the brazing alloy with the surfaces of the junction are at least ternary intermetallic compounds that grow slowly and have a homogenous and dense polycrystalline structure. As the result of this structure, these intermediate layers are very adherent. Also, they have an ability to withstand the penetration of aluminum from the brazing alloy into the steel surface or the special metal surface for several thousand hours at temperatures between 400 and 450° C. On the other hand, when intermediate layers are formed of special metal and aluminum compounds or of ternary compounds formed in a disordered way, they do not have the ability to withstand aluminum penetration.

The figure is a schematic drawing of a metallurgically bonded junction between steel and a special metal which has been formed according to the teachings of this invention. The figure is described in detail hereafter.

When the two pieces to be joined according to this invention are both tubular it is generally better that the steel piece be placed around the adjacent special metal piece if the latter has a thermal expansion coefficient below that of steel. In this way, the clearance between both surfaces increases during the immersing period and decreases during the subsequent cooling. This results in a mechanical binding of a steel part on the special metal part. The lower the temperature, the higher the compression in the junction becomes.

The junction between the pieces to be assembled may be mechanically joined by known processes, for example, conical joining, cylindrical or conical threading, chucking or shrink fitting. The pieces may be assembled before dip-coating or inside the bath itself. Of course, other brazing techniques may be used.

The following examples describe in detail several particular embodiments of this invention. In the examples and claims, all percentages are by weight.

EXAMPLE 1

A non-alloyed steel tube and a zirconium alloy tube containing 1.5% Sn, 0.12% Fe, 0.1% Cr, 0.05% Ni (Zircaloy 2) both having diameters of about 100 mm. were joined in the following manner.

The inside of the steel tube and the outside of the Zircaloy 2 tube were threaded over a 100 mm. length. The total length of the assembly was 600 mm. A brazing alloy bath was prepared to based on Al, containing 7% Si, 3% Zr and 5% Fe and maintained at 750° C. A layer of liquid flux was maintained on part of the surface of the alloy bath inside a graphite cylinder floating on the metallic bath. The tubes were screwed together to form a junction having a slight clearance between the tubes and the junction was dipped into the bath through the flux layer. The junction was alternately moved up and down thus passing it again and again from the flux to the metallic bath. Then the junction was removed from the graphite cylinder containing the flux and dipped into the alloy bath without any contact with the flux. The total immersion time was about 20 minutes. The junction after being removed from the alloy bath was allowed to cool. A section through the metallurgically bonded junction thus formed is shown schematically on FIG. 1. The Zircaloy tube 1 is adjacent the steel tube 2. A layer of brazing alloy 3 fills the space between the threaded tubes. An intermediate layer 4 of Zr-Al-Si alloy is formed between the layer of brazing alloy and the surface of the Zircaloy tube. Another intermediate layer 5 of Al-Fe-Si alloy is formed between the alloy and the surface of the steel tube.

EXAMPLE 2

A metallurgical junction was provided between a non-alloyed steel tube and a zirconium alloy tube containing 2.5% Nb in a manner very similar to that described in Example 1. In this case, the junction was dipped for about 20 minutes into a bath at 750° C. comprising an alloy based on Al, containing 8% Si, 3% Zr, 8% Fe and 12% Nb.

EXAMPLE 3

An 18-10 stainless steel piece was joined to a Zircaloy 2 piece in a manner similar to that described in Examples 1 and 2. The metallurgical joint was provided by dipping the junction for about 20 minutes into a bath at 700° C. The bath was an alloy based on Al, containing 7% Si, 3% Zr, 2% Fe and 3% Cr.

EXAMPLE 4

A metallurgical bond was provided between a non-alloyed steel tube and a non-alloyed titanium tube in a manner similar to that described in the foregoing examples. The junction between the two tubes was dipped for about 10 minutes into a bath at 800° C., comprising an aluminum alloy containing 9% Si, 3% Ti and 10% Fe.

Having thus described my invention with the particularity required by the patent laws what is desired to have protected by Letters Patent is set forth in the following claims.

We claim:

1. The process for providing a metallurgical bond between a special metal piece selected from the group consisting of Ti, Zr, Hf, U, Nb, Ta and alloys of these metals and a steel piece comprising the steps of
    (A) forming a junction by mechanically joining the special metal piece and the steel piece such that there is a clearance between both pieces;
    (B) treating the surfaces of the junction with a molten flux;
    (C) filling the junction with a molten alloy consisting essentially of 1 to 13% Si, 0.2 to 10% of the special metal which is being joined, from 0.2 to 10% Fe, up to 15% of metals selected from the alloying elements of the steel and the special metal alloy, and the remainder Al; and
    (D) allowing the junction to cool.

2. The process according to claim 1 in which the junction is filled by immersing the junction in a molten bath of the aluminum alloy maintained at a temperature between 575 and 800° C.

3. The process of claim 2 in which the junction is assembled before immersing.

4. The process according to claim 2 in which the junction is assembled after immersing.

5. The process according to claim 2 in which the molten flux is disposed on the surface of the alloy bath and the junction is passed from the alloy bath to a flux and back into the bath several times.

6. The process according to claim 2 in which the junction is immersed between 5 and 30 minutes.

7. The process according to claim 5 in which the junction is withdrawn from the alloy bath without contacting the flux layer.

8. The process according to claim 2 in which the steel is placed around the special metal piece to form a mechanical junction.

9. The process according to claim 2 in which the mechanical junction is joined by threading.

References Cited

UNITED STATES PATENTS

| | | | |
|---|---|---|---|
| 2,093,390 | 9/1937 | Wyckoff | 29—504 |
| 3,015,885 | 1/1962 | McEven et al. | 29—504X |
| 3,279,049 | 10/1966 | Ellis et al. | 29—504X |
| 3,299,503 | 1/1967 | Freyberger et al. | 29—504X |
| 3,205,573 | 9/1965 | Seal et al. | 29—474.4 |

JOHN F. CAMPBELL, Primary Examiner

R. B. LAZARUS, Assistant Examiner

U.S. Cl. X.R.

29—474.3, 474.4, 474.6, 503, 504

UNITED STATES PATENT OFFICE
CERTIFICATE OF CORRECTION

Patent No. 3,605,254　　　　　　　　　　Dated September 20, 1971

Inventor(s) Marcel Armand et al.

It is certified that error appears in the above-identified patent and that said Letters Patent are hereby corrected as shown below:

Column 4, line 33, after "steel" insert -- piece --.

Signed and sealed this 18th day of January 1972.

(SEAL)
Attest:

EDWARD M. FLETCHER, JR.　　　　　　ROBERT GOTTSCHALK
Attesting Officer　　　　　　　　　　Acting Commissioner of Patents